US006035123A

United States Patent [19]
Razdan et al.

[11] Patent Number: 6,035,123
[45] Date of Patent: Mar. 7, 2000

[54] DETERMINING HARDWARE COMPLEXITY OF SOFTWARE OPERATIONS

[75] Inventors: Rahul Razdan, Princeton; Michael D. Smith, Belmont, both of Mass.

[73] Assignee: Digital Equipment Corporation, Maynard, Mass.

[21] Appl. No.: 08/554,310

[22] Filed: Nov. 8, 1995

[51] Int. Cl.[7] .................................................. G06F 9/44
[52] U.S. Cl. ........................................................ 395/709
[58] Field of Search .................................. 395/705, 707, 395/709, 706, 708

[56] References Cited

U.S. PATENT DOCUMENTS

| | | | |
|---|---|---|---|
| 4,992,934 | 2/1991 | Portanova et al. | 395/385 |
| 5,301,325 | 4/1994 | Benson | 395/707 |
| 5,307,492 | 4/1994 | Benson | 395/707 |
| 5,339,238 | 8/1994 | Benson | 395/707 |
| 5,396,631 | 3/1995 | Hayashi et al. | 395/709 |
| 5,450,575 | 9/1995 | Sites | 395/707 |
| 5,598,560 | 1/1997 | Benson | 395/709 |

OTHER PUBLICATIONS

M.D. Smith, "Tracing with pixie", Technical Report CSL–TR–91–497, Stanford University, Nov. 1991, pp. 1–29.

*Primary Examiner*—Kevin A. Kriess

[57] ABSTRACT

A new class of general purpose computers called Programmable Reduced Instruction Set Computers (PRISC) use RISC techniques a basis for operation. In addition to the conventional RISC instructions, PRISC computers provide hardware programmable resources which can be configured optimally for a given user application. A given user application is compiled using a PRISC compiler which recognizes and evaluates complex instructions into a Boolean expression which is assigned an identifier and stored in conventional memory. The recognition of instructions which may be programmed in hardware is achieved through a combination of bit width analysis and instruction optimization. During execution of the user application on the PRISC computer, the stored expressions are loaded as needed into a programmable functional unit. Once loaded, the expressions are executed during a single instruction cycle.

18 Claims, 12 Drawing Sheets

FORWARD TRAVERSAL

BACKWARD TRAVERSAL

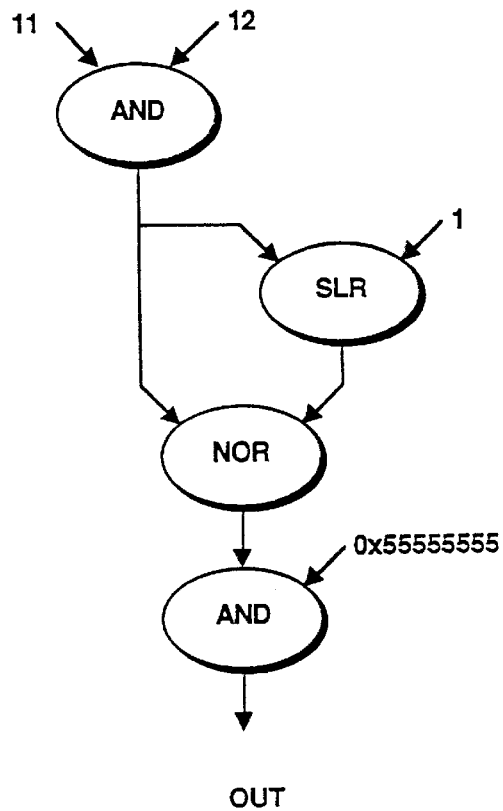
*Figure 8*
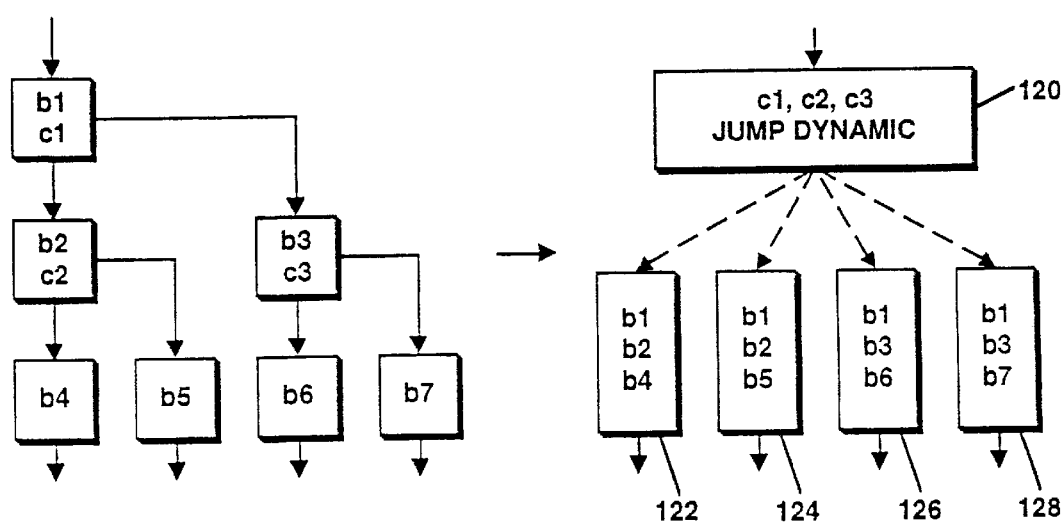
*Figure 11A*  *Figure 11B* bine the performance advantages gained by the RISC architecture with the flexibility provided by the CISC architecture to allow for optimization of the hardware/software interface.

DETERMINING HARDWARE COMPLEXITY OF SOFTWARE OPERATIONS

BACKGROUND OF THE INVENTION

This invention relates generally to computer systems and more particularly to reduced instruction set computer processors.

As it is known in the art, a computer system generally includes a central processing unit for processing an instruction stream. The computer system is a hardware device, typically composed of a number of discrete functional units. The instruction stream is stored in a memory and comprises a set of instructions and data which is recognizable by the hardware residing in the computer system. During operation, each instruction as it is retrieved from memory is decoded to determine the specific function performed by the instruction. Once decoded, the hardware executes the desired function. Thus it can be seen that there is a direct relationship between the instruction set of the computer and the architecture of the computer.

In order to create an instruction stream to run on the computer, each software program that is to execute on the computer system must be decomposed into a series of instructions from the instruction set of the computer. The procedure of breaking down a higher level language computer program into a series of instructions from a given instruction set is typically performed by a software program known in the art as a compiler. Generally the compiler receives as inputs the higher level software language, the available instruction set, and perhaps certain characteristics of the operating computer, i.e. such as the number of working registers available in the computer system. As the compiler reads, or parses, the higher level software program, it distinguishes groups of commands that may be performed by different instructions of the instruction set.

There are two types of instruction sets and associated architectures commonly used in the art. A first type, known as a complex instruction set, is executed on a complex instruction set computer (CISC). The complex instruction set includes specialized instructions to handle common types of high level software commands. In determining which instructions were included in the CISC instruction set, an analysis of particular applications whose performance could be increased by grouping instructions was performed, and a set of instructions was developed. For example, the VAX™ instruction set includes the instruction "Add One and Branch if Less than or Equal" (AOBLEQ) for use during computer loop operations. During processing of this one instruction, values are added, compared against a given value, and a potential branch operation is performed. Thus it can be seen that the complex instruction set serves to increase computer performance for groups of commonly used instructions.

However, there are a number of drawbacks associated with the CISC architecture. When using a complex instruction set, the decode function of the computer system must be able to recognize a wide variety of functions. As a result, the decode logic, while time critical for purposes of performance, grows to be quite complex. However, not every one of the complex instructions are used for each software program, and thus much of the decode logic functionality is seldom used during operation. A second drawback of the CISC architecture arises from the fact that the complex instructions are often of different lengths. That is, each instruction could consist of any number of operands, and take any number of cycles to execute. Thus, when parsing a CISC instruction, it is often difficult to determine when the decode of an instruction was close to completion and when the next instruction in the sequence could be retrieved. This uncertainty associated with instruction length makes the instruction decode logic of the complex instruction set computer even more difficult to design and thus may decrease the overall processor performance.

As a result of the drawbacks associated with the CISC instruction set, a reduced instruction set computer (RISC) began to gain wide acceptance by providing increased performance with minimal design complexity. The reduced instruction set comprised a minimal number of easily implementable, one-cycle instructions, each having the same length. The contents of the reduced instruction set were determined by evaluating a wide range of applications to determine which instructions were most commonly required. Typical reduced instruction sets comprised a LOAD instruction, a STORE instruction, and a handful of arithmetic instructions. The higher level language software program were decomposed into a series of these short instructions by the compiler. As a result, the complexity of the decode logic was greatly reduced and accordingly the performance of RISC computers for certain application exceeded that of CISC computers.

However, there remained drawbacks with the reduced instruction set computers. Although the RISC architecture was adequate for handling a wide range of applications, for a given particular application, with a specific implementation need, the RISC computer performance often fell short of that of the CISC computers. For example, referring again to the AOBLEQ instruction, to perform such an operation in a reduced instruction set computer requires the execution of numerous instructions from the RISC instruction set.

Accordingly, it would be desirable to in some way combine the performance advantages gained by the RISC architecture with the flexibility provided by the CISC architecture to allow for optimization of the hardware/software interface.

SUMMARY OF THE INVENTION

According to one aspect of the invention, a method for optimizing the performance of a software application executing on a computer system includes the steps of parsing the application to identify sequences of instructions of having certain predetermined qualities, where the predetermined quality is that the sequence can be implemented in the hardware available in the computer system. The method further includes the steps of translating each sequence of instructions into one operable function and assigning a unique identifier to each one of the operable functions. The unique identifier allows for the sequence of instructions to be compressed into one instruction which is capable of being executed in a predetermined time, such as one cycle of computer operation. The method further includes the steps of determining a type of each sequence of instructions and determining, according to the determined type, a bit width of the sequence, where the bit width indicates a number of bits required for execution of the sequence by software application.

By determining the width of sequences of instructions, the computer application may easily be subdivided into a number of instruction sequences that may be implemented in one computer cycle via hardware, rather than with many computer cycles via software.

BRIEF DESCRIPTION OF THE DRAWINGS

The above-mentioned and other features of the invention will now become more apparent by reference to the following description taken in connection with the accompanying drawings in which:

FIG. 8 is a flow diagram for use in illustrating the method of performing basic block optimization by the hardware extraction unit of FIG. 4A;

FIGS. 11A and 11B comprise a pair of control flow graphs for use in illustrating the jump control flow graph optimization technique used by the hardware extraction unit of FIG. 4A.

DETAILED DESCRIPTION OF THE PREFERRED EMBODIMENT

Figure 1:
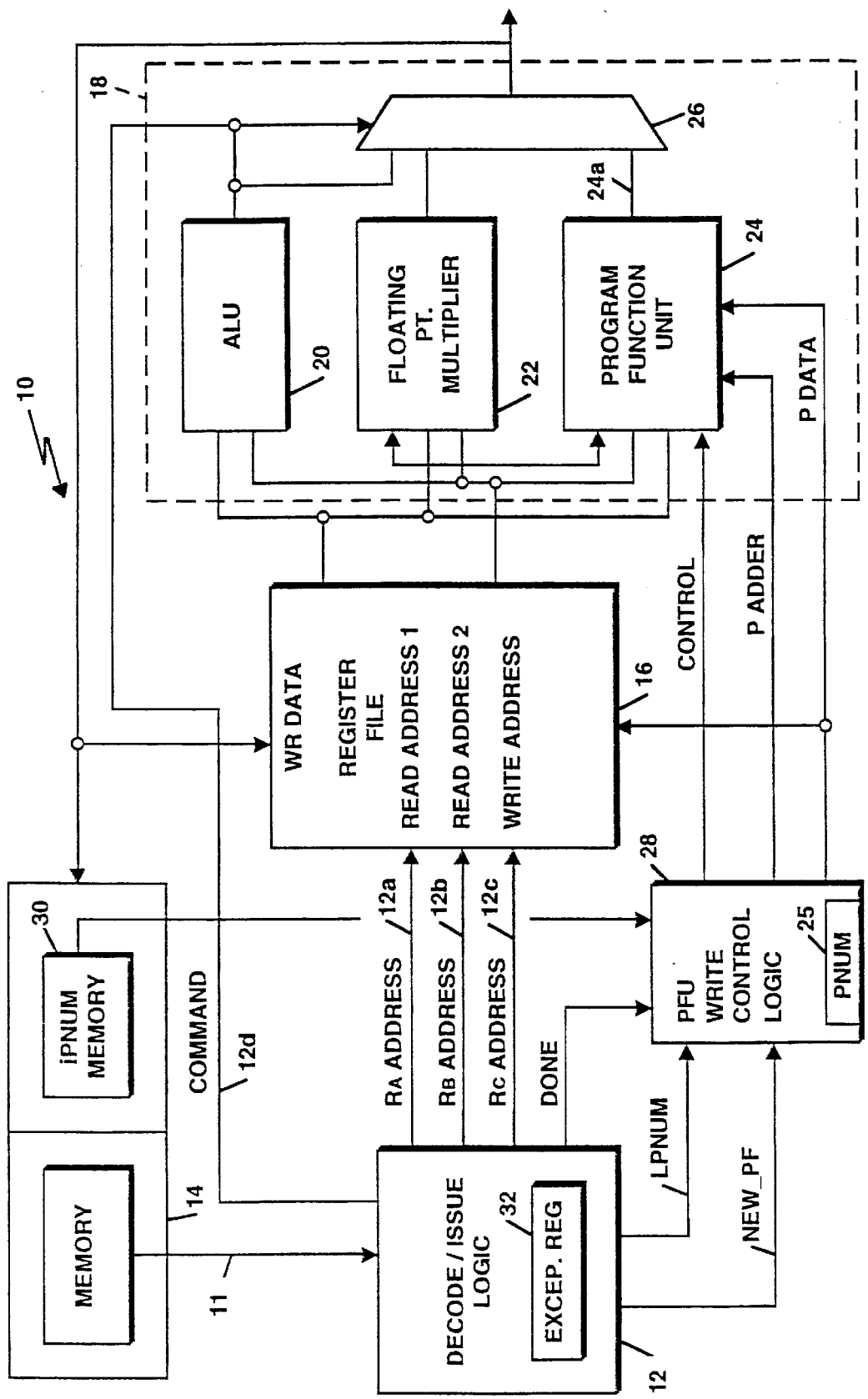
FIG. 1 is a block diagram of a computer system employing a programmable function unit according to the present invention.

Referring now to FIG. 1, computer system 10, according to the present invention, is shown to include decode logic 12 coupled to receive an instruction stream 11 from a memory 14. Decode logic 12 is coupled to provide two read addresses via lines 12a and 12b and a write address via line 12c to a register file 16. The register file provides register data via lines 16a and 16b to a functional unit 18, here shown outlined by dashed lines. The functional unit 18 includes a number of hardwired functional sub-blocks for providing specific arithmetic, logical, or floating point operations such as Arithmetic Logic Unit (ALU) 20 and Floating Point Multiplier 22. In addition, the functional unit 18 includes Programmable Function Unit (PFU) 24, which performs unique functions related to the instruction stream currently being received from memory as will be described more thoroughly below. The PFU 24 includes a Pnum register 25 which is used to identify the type of logical operation currently programmed into and being performed by the PFU 24.

The PFU 24 is designed to fit into the evaluation phase of a RISC CPU pipeline and to maximize the number of functions capable of being implemented by the PFU. For example, a Boolean function that can not be evaluated efficiently using conventional RISC processor instructions and consumes an appreciable proportion computational resources is a prime candidate for evaluation by a programmable function unit such as PFU 24.

Each of the functional units 20, 22, and 24, receive data from the two output ports of register file 16, and provide an output to multiplexor 26. Depending on the currently executing instruction, the command field on line 12d selects the appropriate functional unit output. The output is forwarded to the remaining portion of the computer system logic (not shown) as well the register file as write data.

During operation, the memory 14 stores a series of instructions to be performed in accordance with a currently execution software application. The instructions, as retrieved from memory, have a format as shown below in Table I.

TABLE I

| 31 | 25 | 20 | 15 | 10 | 0 |
|---|---|---|---|---|---|
| Opcode | Ra | Rb | Rc | LPnum | |

In the present embodiment of the invention, the opcode is a 6 bit field that defines the command to be executed during the operation of the instruction. Typical RISC opcode field values may correspond to either LOAD or STORE instructions, as described above. In the present invention, an additional opcode, the EXPFU Opcode is included in the instruction set. The purpose of the EXPFU Opcode is to identify the instruction as one associated with the PFU as will be described below.

The Ra field and Rb field of the instruction each comprise 5 bits and identify the register values of the source operands of the instruction. For example, for an ADD instruction, the value of the register specified in the Ra field would be added to the value of the register specified by the Rb field. The Rc field similarly comprises 5 bits and specifies the destination register for the instruction.

The LPnum field is an 11-bit field to define a particular logical function to be performed by the PFU unit 24. The LPnum field is only of interest when the opcode field is encoded to indicate an EXPFU instruction. The LPnum field is basically an identifier corresponding to an available programming configuration for the PFU for a given application. As mentioned previously, the LPnum field comprises 11 bits and therefore there are 2048 unique PFU programming configurations available to an application.

During operation, when the decode/issue logic 12 receives an EXPFU instruction from memory 14, the LPnum of the instruction is compared against the currently stored Pnum in the PFU 24. If there is a match, the EXPFU instruction executes normally; i.e. the Boolean function stored in the PFU 24 uses the inputs from register file 16 on lines 16a and 16b to provide an output to mux 26. If there is not a match, the PFU 24 must be loaded with a new function. Apart from the possible time needed to load an instruction into PFU 24, the instruction (which may consist of many RISC instructions) executes as a single instruction during a single instruction cycle.

Loading the Programmable Function Unit

As mentioned above there are potentially 2048 different logical functions which are capable of being loaded into the PFU for a given application. The logical functions are stored in a reserved portion of memory 14, shown in FIG. 1 as LPnum memory 30. Although here LPnum memory 30 has been shown as a discrete block, it should be noted that any portion of memory 14 may be allocated as LPnum memory 30.

The functions that are stored in LPnum memory 30 are determined during the compilation of a software application by the compiler logic. The stored functions represent instructions or groups of instructions that are extracted from a portion of the instruction stream of the application. The method for determining which instructions should be extracted for execution by the PFU 24 is described in detail below. In summary, once the compiler has determined that a group of instructions may be optimally executed by the PFU 24, it extracts the group of instructions, evaluates them into a single function, and creates a single instruction suitable for execution by the PFU. The new instruction is assigned an LPnum to be used during execution to identify the particular instruction.

The PFU is programmed with initial and successive LPnum functions via the EXPFU instruction. As described previously, during operation, when it is determined that the PNUM stored in the PNUM register 25 does not match the LPnum indicated in the EXPFU instruction, data is retrieved from the LPNUM memory 30 portion of memory 14 for programming the PFU. The programming data comprises an array of data, each bit of the array associated with a specific cell of the PFU.

Figure 2A:
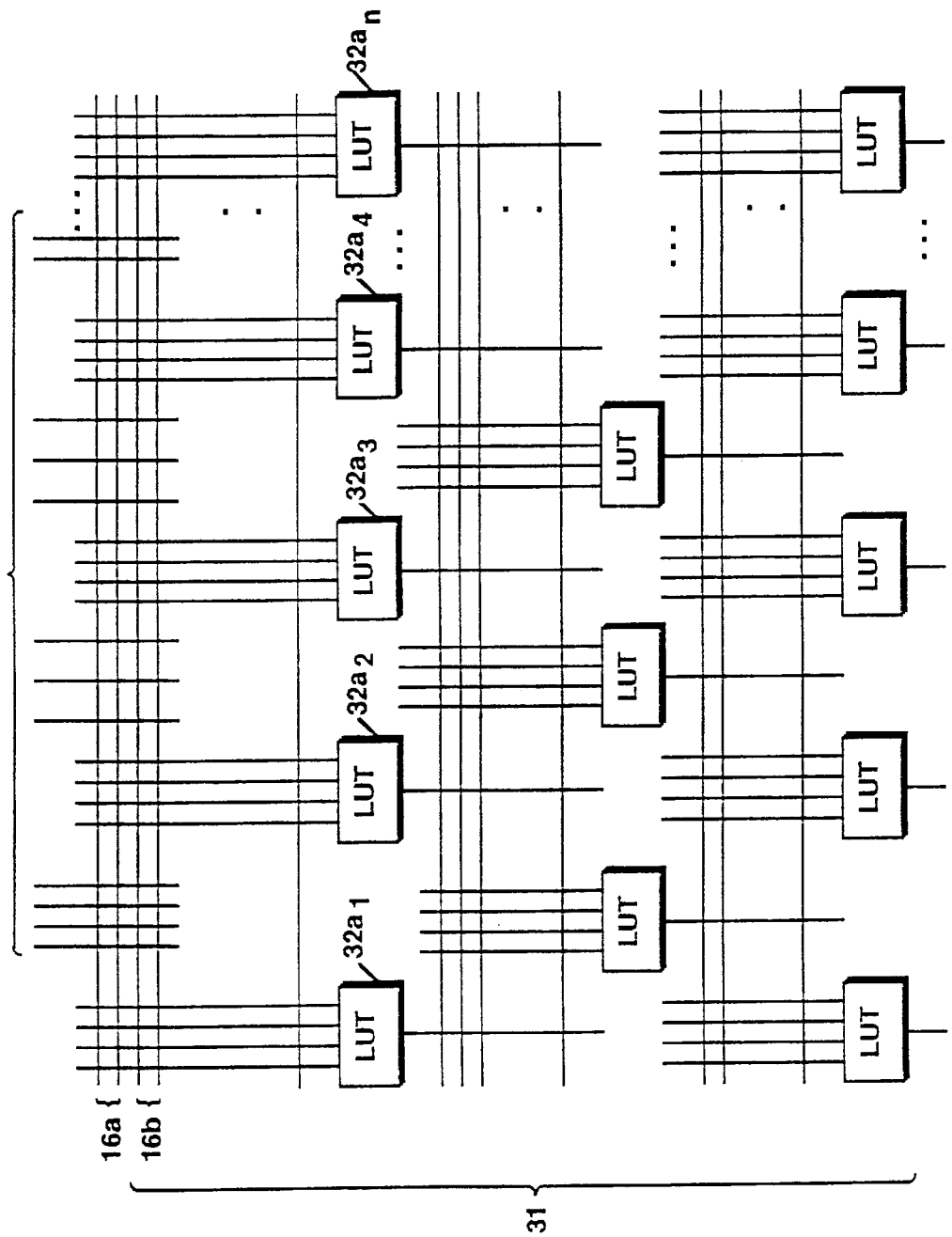
FIGS. 2A–2C illustrate the programmable function unit of the computer system of FIG. 1.
Figure 2B:
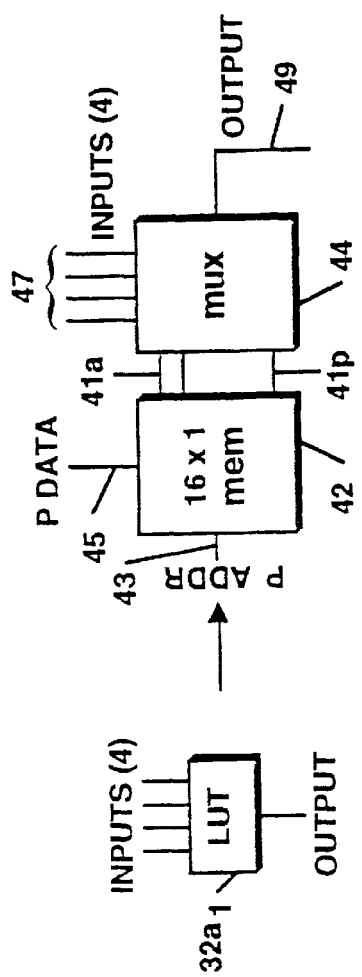
Figure 2C:
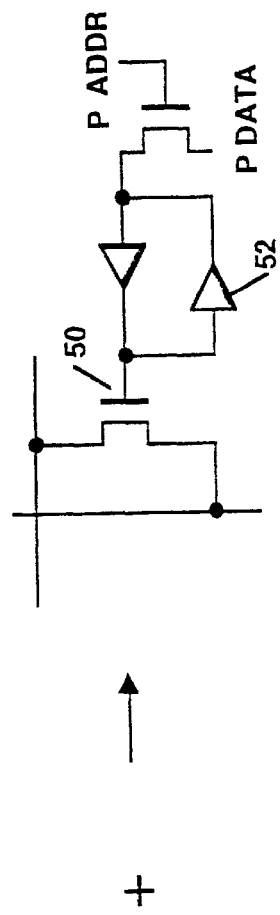

Referring now to FIGS. 2a–2c, an example of the functional implementation of PFU 24 is shown in FIG. 2a to include interconnection matrix 31. Interconnection matrix 31 includes a plurality of Look Up Tables (LUTs) $32a_1$–$32a_n$ coupled in various formations to the inputs from the operand buses 16a and 16b. It should be noted that although here only two signal lines from each operand bus have been shown, all of the bits from the operand busses Ra and Rb are input the PFU. Both the contents of the LUTs as well as the interconnections between the LUTs constitute programmable elements of the interconnection matrix 31.

In FIG. 2b LUT $32a_1$ is shown to include a 16×1 memory array 42 coupled to multiplexor 44 via 16 signal lines 41a–41p. Memory array 42 also has as its inputs programming address (Paddr) lines 43 and programming data (Pdata) lines 45. The sixteen locations of LUT memory 42 are programmed via the Paddr lines 43 and the Pdata lines.

In addition to the sixteen signal lines 41a–41p, multiplexor 44 is coupled to four input select lines 47 and one output line 49. The select inputs of the multiplexor 44 are coupled to either operands from the input busses Ra and Rb, outputs from other LUT's in the PFU, or may be individually programmable elements of interconnection matrix 31. It can be seen that depending on the combination of signals asserted on input lines 47, one of the sixteen locations from memory array 42 will be selected. The contents of the selected location are outputted via output signal line 49, and are passed on to either other LUT inputs or directly provide data to the PFU output bus 24a (FIG. 1).

Referring now to FIG. 2c, the logic associated with each of the interconnections shown in FIG. 2A is shown to include a transistor 50 coupled between two busses, 51a and 51b. Coupled to the gate of the transistor 50 is a state device 52. The state device is written using the Paddr and Pdata fields as will be described later herein. The value stored in the state device determines whether or not a connection will be enabled between the two busses 51a and 51b.

Thus it can be seen that the interconnection matrix 31 that defines the functions of the PFU 24 includes elements relating to data stored in respective LUTs as well as elements defining the various interconnections between the LUTs.

As can be seen above, the contents of LUT memory identify a relationship between the input select signals to the LUT, and thus can be used to define a logical function. By way of illustration, assume that an Exclusive-OR function is to be performed between two busses, each bus comprising one bit. A matrix defining the interconnectivity would appear as shown below in Table II, with each of the matrix values stored in an addressable memory cell such as memory array 42 in FIG. 2b.

TABLE II

| A\B | 0 | 1 |
|---|---|---|
| 0 | 0 | 1 |
| 1 | 1 | 0 |

Thus, when the PFU receives, on input lines 47, on line A a value of '0' and on line B a value '1', the interconnectivity matrix provides an output value of '1' to the output data line. Similarly, when the PFU receives on line A a value of '1', and on line B a value of '1', the output provided would be a '0'.

As mentioned previously, the programming of the 16×1 memory cells of the LUT's and of the interconnection of the busses in the PFU is performed via an address on the Paddr bus and data on the Pdata bus. The width of the Pdata bus is a matter of design choice. For example, given that there are 1028 individual memory cells to program, if the Pdata bus comprises 16 bits, 64 writes would be required to program the PFU. Thus, the Paddr bus would comprise 6 bits. The data for programming the functions into the PFU, hereinafter referred to as the interconnectivity data, would be stored as a block of data in LUT memory 30.

The period of time required to write the elements of the interconnectivity matrix in the PFU is a function of the density of the LUT memory and the hardware resources allocated for PFU programming. In practice the PFU programming memory is very sparsely populated, so most of the bits are in the 'off' (zero) state. A scheme that uses a hardware reset to initialize all the bits to a zero value, and only programs the words which contain one-bits may advantageously be used to significantly reduce the overall latency required for programming the PFU.

Figure 3:
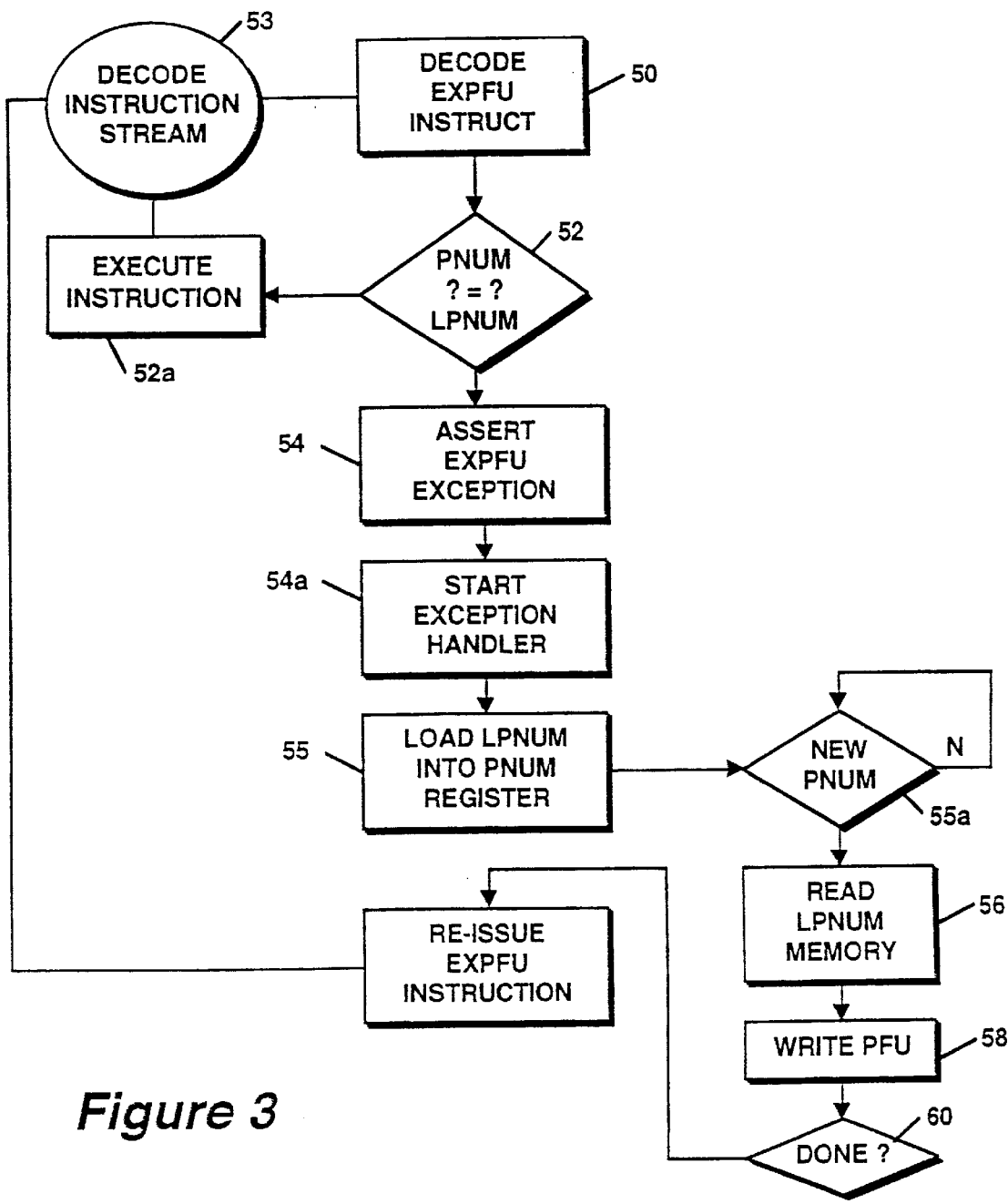
FIG. 3 is a flow diagram illustrating the method used to program the functional unit of FIGS. 2A–2C.

The interconnectivity data is loaded into the PFU as follows. Referring now to FIG. 3, a flow diagram is shown illustrating the procedure used to load the PFU with the interconnectivity matrix data. At step 50, the decode/issue logic 12 decodes an instruction that is an EXPFU instruction. At step 52, decode/issue logic 12 compares the LPnum of that instruction against the Pnum stored in register 25. If, at step 52 it is determined that there is a match, then the functionality loaded in the PFU is the correct functionality for this instruction. At step 52a, the instruction is executed, and the decode/issue logic 12 proceeds to step 53 to fetch the next instruction. If at step 52 it is determined that there is a mismatch, then the functionality currently loaded in the PFU is the incorrect functionality for this instruction. The flow of instructions continues, with the incorrect operation being performed on the input operands Ra and Rb. In the meantime, the decode logic 12 proceeds to step 54 where it asserts a signal EXPFU EXCEPTION. The signal EXPFU EXCEPTION is logged in the system exception register 132. The exception triggers the initiation of a software exception handling routine at step 54a, which executes at the completion of the currently executing EXPFU instruction. It should be noted that, because the function stored in PFU is the incorrect function, the results of this instruction will be discarded by the exception handler.

At step 55, the software exception handling routine first stores the LPnum in PNUM register 25. When, at step 55a, the write control logic 28 detects the update of the LPNUM in the PNUM register 25, at step 56 it initiates a transaction to retrieve a block of data from LPNUM memory 30 starting at the new LPNUM address stored in PNUM register 25. The instruction set includes a dedicated Programmable Array Logic (PAL) instruction that is used to sequentially load the PFU with interconnectivity data using existing LOAD instructions.

Upon the execution of each LOAD instruction, data in the block is retrieved from LPNUM memory 30, forwarded by PFU write control logic 28 to the PFU on Pdata line 24b, and written at step 58. An address, corresponding to a plurality of memory cells in the interconnectivity matrix, is forwarded on line 24a to the PFU. Control signals on line 24c are provided from PFU write control logic to control the updating of the memory cells of the LUT. The method of controlling writes to a memory cell is well known in the art and will not be described in further detail herein. Suffice it to say that for each retrieved line of data from LPNUM memory, the line of data is written to the appropriate location of the PFU. When the entire block of data has been transferred to the PFU, the PFU write control logic 28 asserts the signal DONE on line 12c to the decode/issue logic 12.

During the period of time that the contents of the PFU are updated, the decode/issue logic 12 is stalled awaiting access to the PFU. Upon receipt of the signal DONE on line 12c, at step 60 the exception handler is completed. At the completion of the exception handler, the EXPFU instruction that initially caused the exception is replayed using the updated PFU, and instruction flow returns to step 53, where the processing continues as normal, with the next instruction being fetched by the decode/issue logic.

It should be noted that the implementation of a PFU discussed with reference to FIG. 2 and FIG. 3 is simply an example implementation, illustrating one potential method of providing a programmable function unit. Other methods of programming a functional block are well known, and may easily be adapted for use in the present invention by one of ordinary skill in the art.

Although in the method of programming the PFU described above the decoder is stalled for a period of time, this stall is incurred only as a result of the first execution of a new EXPFU instruction. Because of the method used to select which instructions/groups of instructions become EXPFU instructions, it is assured that the amount of time required to update the PFU does not undermine system performance. The selection of which groups of instructions are to form EXPFU instructions is described below.

Selecting Operations to be Performed by EXPFU Instructions

A typical mode of operation would use the EXPFU instruction inside the inner loop of an application to accelerate performance. The EXPFU instruction is used to combine multiple instructions within the loop. Thus, during operation, once the PFU was loaded with the EXPFU operation, the performance of the operation is increased because the previous multiple instructions are executed in only one PFU cycle.

For example, consider a compute intensive application such as an integer factorization using the Pollard-Raho method which is heavily dependent on the greatest common divisor (gcd) calculation. The gcd calculation between two short integers a and b has the following form:

1. a=norm(a);
2. B=norm(b);
3. if (a>b) a=a−b; else b=b−a;

where 'norm' indicates the function of normalization of the input variable. The normalization operation is the bottleneck to the whole integer factorization algorithm. A PFU can be programmed to perform this normalization for a short integer very quickly. The first time the EXPFU instruction for the norm operation is encountered, an exception is raised, and the PFU is programmed with the normalization Boolean function. Afterwards, the norm operation can be executed in a single cycle.

The selection of which groups of instructions are to be programmed into the PFU involves the following considerations. First, the amount of room available in the processor unit to store a PFU is considered. Second, the functional unit should fit into the evaluation phase of a pipeline, which executes in a fixed period of time. Therefore, the PFU should store only functionality that can be evaluated within that time period. However, this functional unit must also maximize the number of "interesting" functions which can be implemented by the PFU. A Boolean function is "interesting" if it cannot be evaluated efficiently using the existing instruction set and the evaluation of this function consumes a significant proportion of an applications computational resources.

Figure 4A:
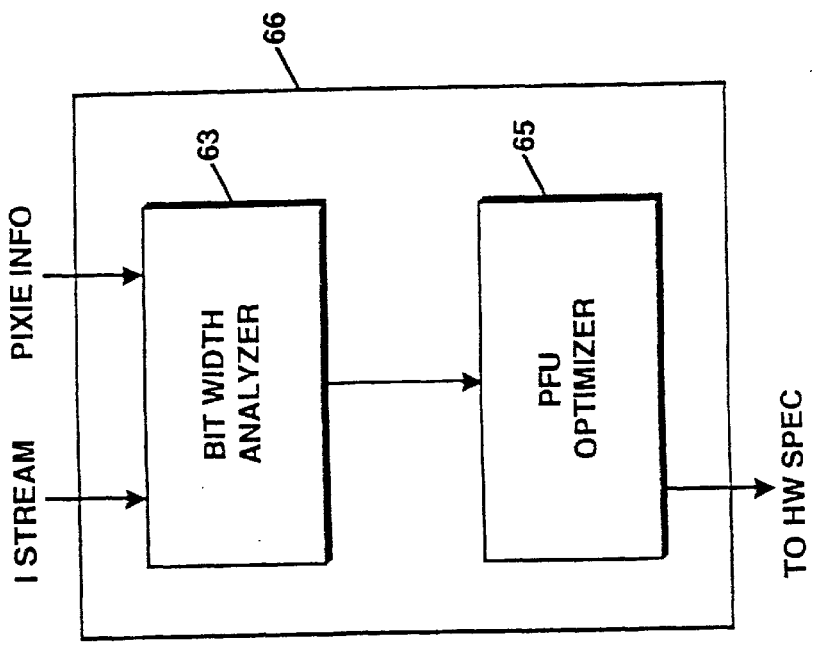
FIG. 4A is a block diagram of the hardware extraction unit of the compiler of FIG. 4.
Figure 4:
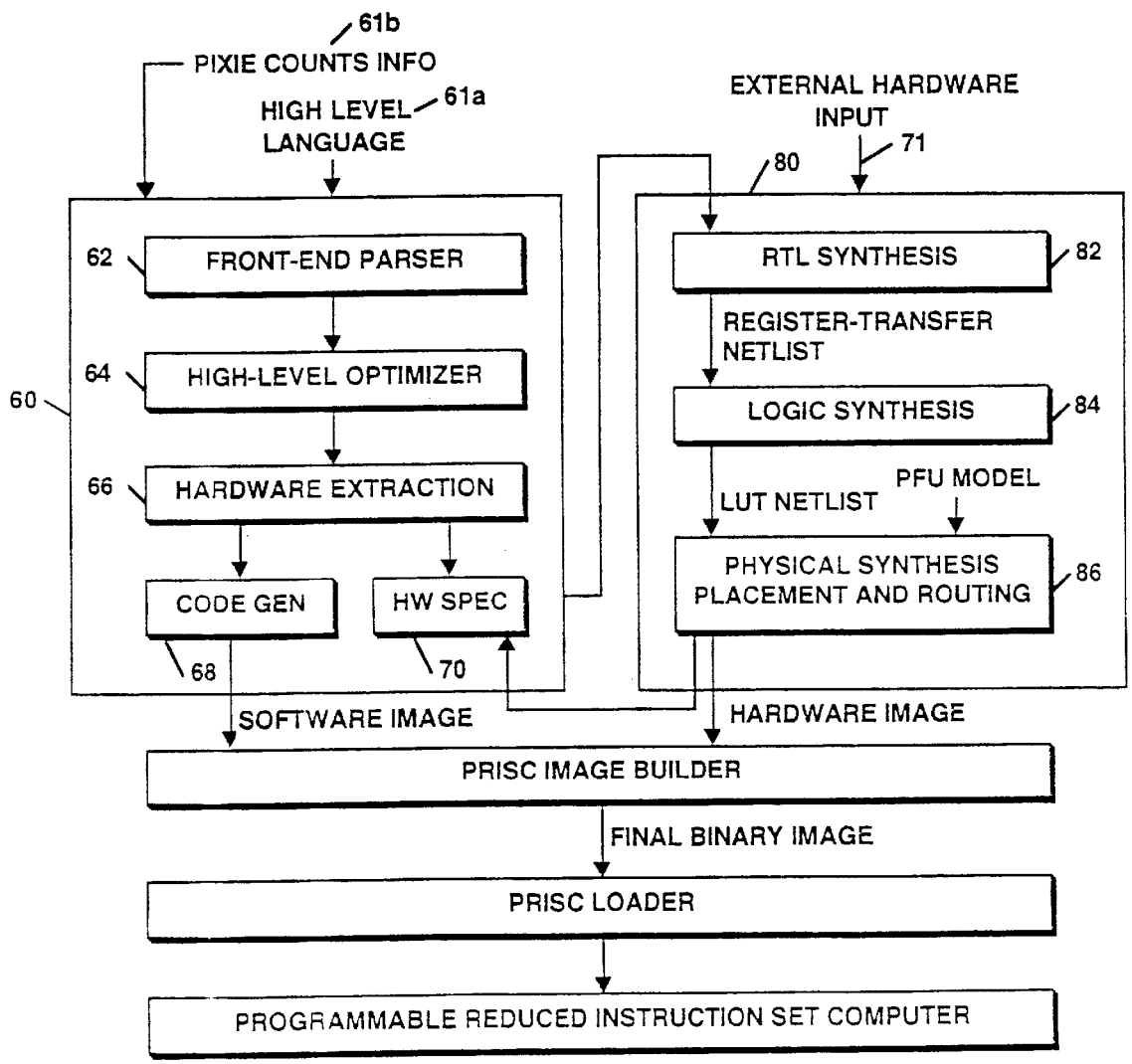
FIG. 4 is block diagram illustrating a compiler for use in the compiling applications for execution by the computer system of FIG. 1.

Referring now to FIG. 4, the compilation process for this embodiment is shown. The inputs to a compiler 60 are the source file 61a of a high-level programming language (such as C) and execution profile information 61b from a performance analysis program, for example the "pixie" program described by M. D. Smith in "Tracing with pixie", Technical Report CSL-TR-91-497, Stanford University, November, 1991. The pixie program uses counters to determine a profile of the software application. Such profile may include information about how often certain instructions are executed, and which portions of the application comprise the bulk of the processing effort. The first portion of the compiler 60 is the front-end parser 62. The front end parser scans the input source code and translates the code into a string of symbols and operations that are input into the high-level optimizer 64. The information from the parser is forwarded to the High-Level Optimizer 64. Conventional compilers perform many optimizations on the code received from the parser such as procedure inlining, loop optimizations, and constant propagation.

In typical compilers, the output of the optimizer 64 is fed directly to a code generator 68, which uses the available instruction set to output the compiled software image. However, according to the present invention, a hardware extractor 66 is included between the optimizer 64 and the code generator 68. The hardware extractor 'recognizes' certain attributes of instruction sequences which are candidates for implementation in the PFU. One of the attributes recognized by the hardware extractor is the sparseness of the instruction sequences.

In order to have a reasonably sized PFU that executes within a given time constraint, the Boolean function should be relatively sparse. Dense Boolean functions cannot be programmed into a PFU due to resource constraints. The density of a Boolean function is highly dependent upon the bit width of the component instructions. The cost of a short operation does not change the software evaluation cost for almost all of the RISC CPU instructions, so an additional bit width analysis must be added determine the correct hardware costs. For example, a byte ADD and a full word ADD have the same resource costs in terms of pipeline scheduling for a software compiler, but the two operations have vastly different hardware costs.

The 'pixie' profile information, i.e. the counts of the most frequently executed instructions, is used to prioritize the results of the hardware extraction step. Depending upon the size of the LPnum memory, which dictates the number of instructions that may be implemented by the EXPFU, the instruction stream is partitioned into instruction sequences which are to be implemented using the given instruction set, and those that are to be implemented in hardware using an EXPFU instruction. Referring briefly to FIG. 4A, the Hardware Extraction unit 66 is shown to further include a bit-width analyzer 63, which determines the width of the instructions, and a PFU optimizer unit 65, which optimizes those instructions selected as PFU instructions in order to minimize the space and time characteristics of the PFU instructions. The bit-width analyzer 63 and the PFU optimizer unit 65 will be described in detail further herein.

Referring again to FIG. 4, once the partitioning is completed, the instructions which are to be implemented using the given instruction set are forwarded to the Code Gen unit 68. The Code Gen unit translates the input instructions into a software image, using the desired instruction set. The instructions which are to be implemented in hardware, i.e. via an EXPFU instruction, are forwarded to HW Specifier unit 70, where register assignment is performed. The output from the HW Specifier unit 70, including the functional information from the hardware extraction unit 66 is forwarded to the Hardware Synthesis block 80. The Hardware Synthesis block 80 also receives information on line 71 as to the characteristics of the PFU.

The Hardware synthesis block 80 uses known logic synthesis techniques to translate the logical instructions provided from compiler 60 into an array of bits defining the interconnectivity matrix of the PFU. The Hardware synthesis block 80 thus includes a register-transfer logic synthesis block 82 which creates a netlist dictating the bit elements of the registers which are to be effected by the operation. This register-transfer netlist is then forwarded to the Logic Synthesis block 84 which provides the logical connections of the PFU model, as well as defining the contents of the LUT's of the PFU. During the logic synthesis operation, logic minimization algorithms are used to reduce the number of LUT's and interconnect resources that are used by the input function. This information is then fed to the Physical Layout block 86, which maps the logical interconnections into the physically existing PFU. The output of the hardware synthesis logic 80 is a Hardware image; i.e. an array of bits, as described above, identifying the interconnections and LUT contents of the PFU.

The hardware synthesis logic has not been described in complete detail because the exact implementation of the hardware synthesis logic is not crucial to the invention, and because hardware synthesis techniques are well known to those of skill in the art. In addition, in this embodiment of the invention only PFU's using combinatorial functions are used. However, it should be understood that if a PFU was of a type allowing for programmable state machines, sequential loop operations could additionally be extracted as PFU operations.

Thus far it has been described that the most frequently executed instructions are executed as PFU instructions, however, it should be noted that additional characteristics of the instruction, in addition to their frequency, must be weighed before determining which instructions are selected as EXPFU instructions. As mentioned above, the bit-width of the data used in an instruction or a series of instructions plays a large part in determining the density of the Boolean function, and therefore is also important in determining whether or not the functions performed in instruction or instruction sequence may be performed via an EXPFU instruction. Thus, the first analysis of each instruction is an analysis of the width of the data which is affected by each instruction or instruction sequence. This analysis is performed in the bit width analyzer 63 (FIG. 4A) of the Hardware Extraction unit 66 as described below.

A ternary algebra, similar to the one used in most logic simulators, is used to find the bit usage and width for every variable in the static code stream. The algebra is based on a partially ordered set $\{0,1,X\}$, with X<0 and X<1 where the ordering represents the certainty of a variable state. The third value, X, indicates an unknown state while 0 and 1 represent fully defined states. All of the computational instructions have definitions in Boolean space, defined in the manner of a truth table as described above with reference to TABLE II. If these instructions can be redefined in the ternary space with functions which are monotonic with respect to partial ordering, the results can be used to determine the dynamic values of variables with static analysis.

The mapping from binary to monotonic ternary functions can easily be achieved by offering ternary equivalents to the standard gates. For example, the ternary equivalent of a NAND gate is shown below in TABLE III:

TABLE III

| NAND | 0 | 1 | X |
|---|---|---|---|
| 0 | 0 | 1 | 1 |
| 1 | 1 | 0 | 1 |
| X | 1 | X | X |

Notice that in Table III above, the mapping from inputs to outputs is monotonic with respect to the partial ordering of the ternary set, so that given a function fn: $\{0,1,X\} \rightarrow \{0,1,X\}$ and elements a,b $\in \{0,1,X\}$ then the following property is true : $a \leq b \Rightarrow fn(a) \leq fn(b)$. For example, if any one input to the NAND gate shown above is set to zero, the output will always provide a '1' value, independent of the other input. According to this monotonic property, once a variable is declared with a 0 or 1 value in the static analysis, no value assignments in the dynamic execution can change its state.

The method for width reduction initializes all variables to the X state for every bit position. Then, a combination of forward and backward traversals of the application are performed in a process known in the art as constant propagation. The forward traversal evaluates every instruction and checks to see if the evaluation changes the output bit vector. The output bit vector change will change for many instructions such as Load Unsigned Byte or Shift Logical Left. For example, for a Load Unsigned Byte instruction, the upper bits are guaranteed to be at a zero value. An event-driven algorithm is used to follow the changes until quiescence.

The backward traversal checks to see which bits of a variable are used in subsequent instructions, and goes backwards to eliminate unnecessary bit calculations For example, if a variable was stored to memory using a Store Byte instruction, and was not used elsewhere, any instructions which generated the inputs for the Store need only generate 8 bits of information. The backward traversal algorithm also uses an event-driven algorithm to propagate changes throughout the application code.

For this method to work correctly, the forward and backward ternary mappings must be known for all component instructions. In forward traversal, a function evaluation determines the output bits which might be X given the state of the input vectors. In backward traversal, an evaluation determines the input combinations which produce an output bit which is at X state.

Figure 5A:
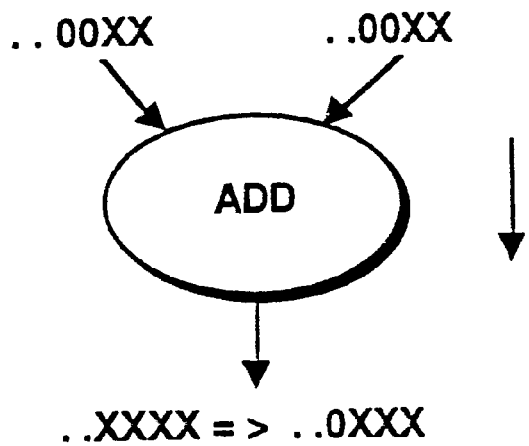
FIGS. 5A and 5B are flow diagrams illustrating a process used to perform width analysis on basic blocks by the hardware extraction unit of FIG. 4A.
Figure 5B:
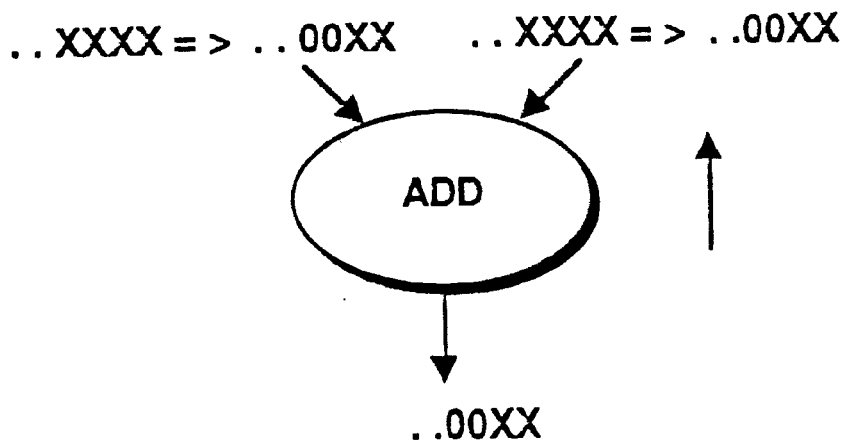

Referring now to FIGS. 5A and 5B, an example of inputs and outputs to an Adder, using both forward traversal (FIG. 5A), and backward traversal (FIG. 5B) is shown. As shown in FIG. 5A, in the forward traversal case, given two input vectors having the lowest two bits in the X state results in an output vector having only three bits in the X state. The third bit becomes an X state because it cannot be determined whether or not the two input vectors will result in a carry operation into the third bit position. As shown in FIG. 5B, in the backward traversal case, given an output vector having only two bits in the X state, the inputs are determined to have no more than two bits in the X state.

The above methods of forward and backward traversal are effective for determining the width of 'basic blocks' of instructions. A basic block may be identified as one instruction, such as the ADD instruction described with reference to FIGS. 5A and 5B. In addition, a basic block may comprise some number of sequential instructions. Depending on the desired width of the PFU function, more or less sequential instructions may be grouped together to form the 'basic block'.

While the forward and backward traversals described with reference to FIGS. 5A and 5B are sufficient to propagate the ternary bit vectors within basic blocks, in order to propagate past basic block boundaries a different set of propagation rules defining ternary relationships must be developed. A basic block boundary occurs at a location in the instruction sequence where the sequence of instructions is deterred as a result of branch or jump instructions. Two general categories where the instruction flow may be deterred from its normal, sequential instruction flow are hereinafter referred to as 'splits' and 'joins'. A split of instruction flow may occur during a subroutine CALL instruction when the sequential flow of instructions is interrupted and diverted to a subroutine operation. A split also occurs for a JUMP instruction, an absolute BRANCH instruction, and for a conditional BRANCH instruction when it is determined that the branch condition has been satisfied.

A 'join' situation occurs when multiple instruction flows merge into one instruction sequence. In analyzing an instruction sequence for purposes of determining the width of operations, a 'join' is determined from the standpoint of the instruction currently being analyzed. The join situation occurs when the instruction currently being analyzed may have been able to have been reached by more than one means sequence of instructions. The various 'splits' and 'joins' that exist in a software instruction stream may be mapped using a Control Flow Graph of the application.

Figure 6A:
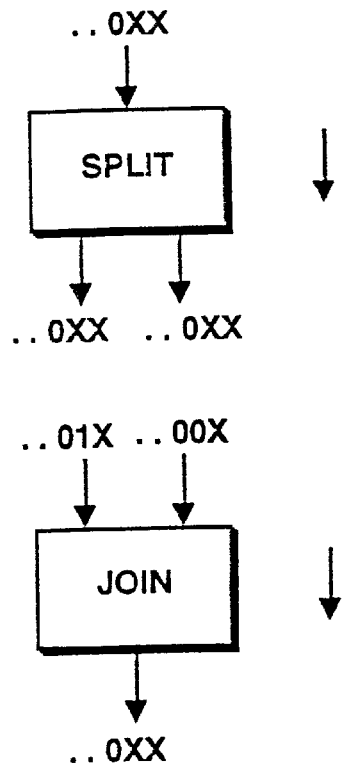
FIGS. 6A and 6B are flow diagrams illustrating a process used to perform width analysis on control flow graphs by the hardware extraction unit of FIG. 4A.
Figure 6B:
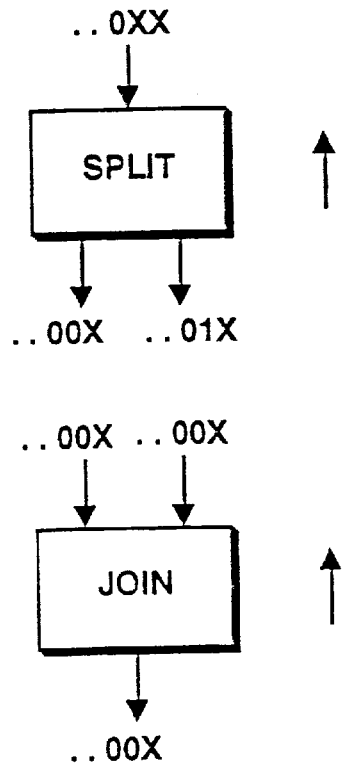

Referring now to FIGS. 6A and 6B, an example Control Flow Graph (CFG), and the method of determining operation width via forward and backward traversal is shown. In FIG. 6A, a 'split' instruction is seen to be an instruction where one input instruction may be diverted down to more than one instruction path. Similarly, a 'join' instruction is seen to be an instruction that is reached via one or more independent instruction sequences. Although only two instruction paths have been shown as input for 'joins' and output for 'splits', it should be understood that the described method of width analysis is equally applicable to split transactions that are diverted to more than two different instruction pathways. However, for ease of explanation, only two independent instruction pathways will be discussed herein.

FIG. 6A illustrates the forward traversal method of performing width analysis of both a 'split' and a 'join' instruction In the forward traversal, a fanout function is performed as the variable vector is duplicated, or 'split' to each propagate to two different paths having the same undetermined variable width. For the forward traversal of a join instruction, two input path variables are resolved into one output path variable. In this example, note that although each input path has only one bit element that is in an undetermined state, because the next adjacent bit differs on each input path, the output state of the join instruction for that bit location is undefined.

FIG. 6B illustrates a backward traversal result of a width analysis of both a 'split' and a 'join' instruction. In the backward traversal, the join instruction performs a fanout function by propagating the results of the output path to both of the input instruction pathways. A split instruction, for purposes of backward traversal, requires a resolution of two output paths down to one input path. Note again that in this example, although each split output path has only one undetermined variable, because the values of each of the bits adjacent to the undetermined variable may differ, the input state for that bit location is also undetermined.

The function used to resolve the undetermined bit for the forward traversal of a join instruction and similarly for the backward traversal of the split instruction is shown below in Table IV, where P1 indicates the input data value from Path 1 and P2 indicates the input data value from Path 2:

TABLE IV

| P1/P2 | 0 | 1 | X |
|---|---|---|---|
| 0 | 0 | X | X |
| 1 | X | 1 | X |
| X | X | X | X |

Note that the above function only provides a determined value when both of the bits on the paths are equal.

While the above techniques describe a method for width analysis of basic blocks and for join/split situations, a problem arises in determining the width analysis for instructions which border the backward edge of the loop. Because it is unclear how many iterations of the loop have been performed, it is difficult to determine the extent to which the bits of the operation have been affected.

In order to determine the bit width of an instruction on the backward edge of a loop, a special analysis is performed to determine the width of fixed length loops. For these loops, the size of the iterator is reduced based upon the loop size, and the ramifications of the reduction are propagated using the basic block and control flow algorithms described above. Given the bit values for all the variables in the application, the hardware computational complexity of the functional units can be easily calculated.

For example, given the below code sequence:
for (I:=0 to 3) m++;
the variable 'I' may be determined to have a maximum width of 2 bits. Thus, given that the size of the variable 'm' is known going into the loop, this size would be increased by a maximum of two bits during the loop evaluation.

Figure 7:
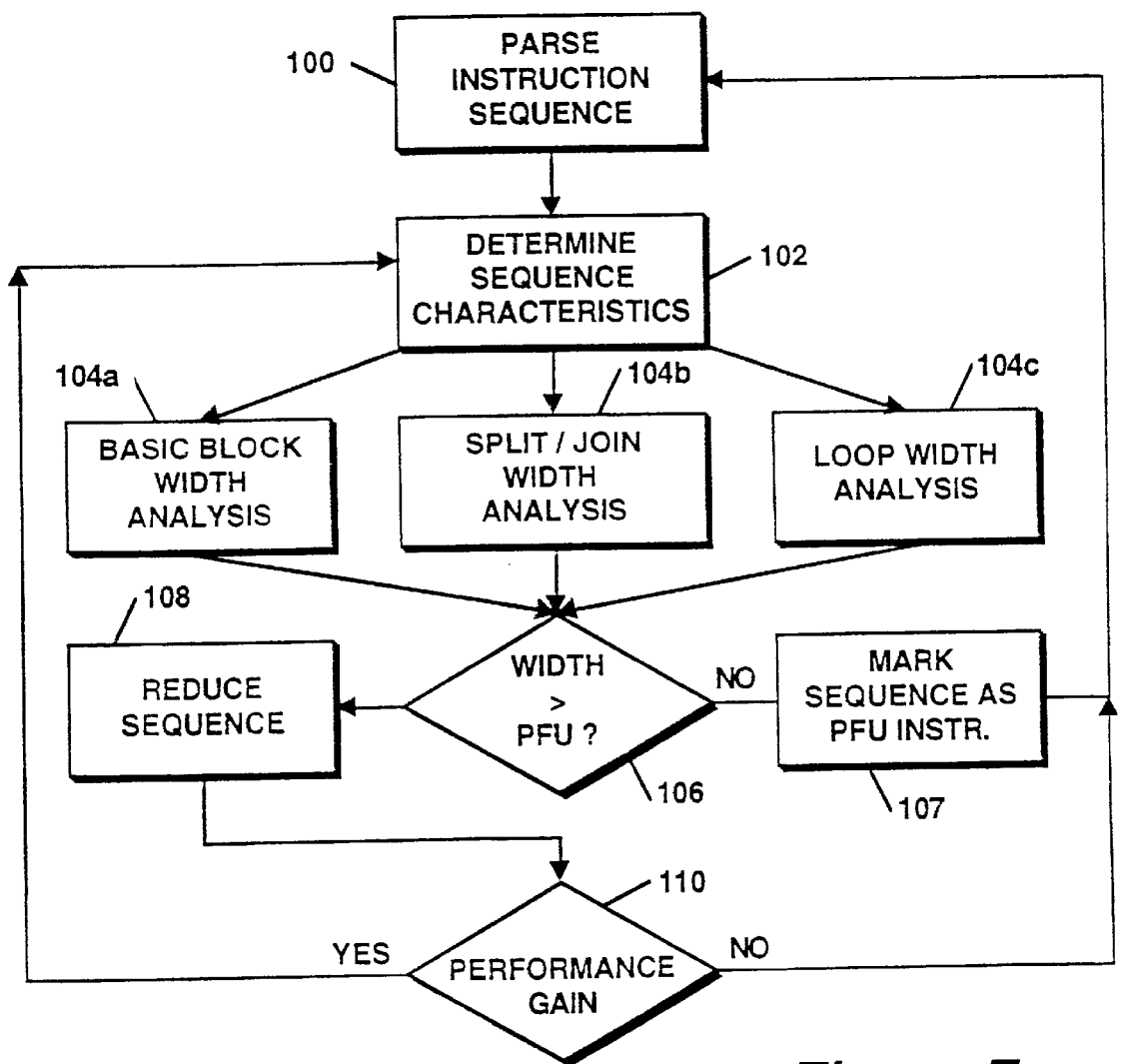
FIG. 7 is a flow diagram illustrating the process of width analysis performed by the hardware extraction unit of FIG. 4A.

Referring now to FIG. 7, a flow diagram illustrating the functionality of the bit-width analyzer 63 (FIG. 4A) in performing a selection of an instruction sequence as a PFU instruction. At step 100, during the parsing of the instruction stream, a sequence of instructions is selected. At step 102 the characteristics of the instruction sequence are determined.

For example, it is determined whether the instruction sequence comprises a basic block of instructions, a split/join instruction sequence, or a loop sequence. Depending upon the characteristic of the instruction sequence, the process continues to steps 104a, 104b, and 104c, where the width of the instruction sequence is determined using the methods described above with reference to FIGS. 4–6. When the width of the instruction sequence is determined, the process proceeds to step 106 where the determined width is compared against the width capability of the PFU. If the instruction is capable of being stored in the PFU, at step 107 it is marked as a PFU-LOGIC instruction, and the process returns to step 100. If, at step 106 it is determined the width is too large for the instruction sequence to be performed, at step 108 the instructions sequence is reduced by removing an instruction to obtain a sequence which may be capable of fitting in the PFU. At step 110, a determination is made as to whether performing the reduced instruction sequence in one PFU instruction would still result in a performance gain by reducing the number of execution cycles. For example, during basic block extraction, it may be determined that a two instruction sequence may be implemented in the PFU. However, due to lack of resources in the PFU, the feedback mechanism may determine that the two instructions would have to individually be implemented in the PFU. Because no performance gain would be achieved by implementing both instructions in the PFU rather than simply implementing them with the existing logic, these instructions are determined to be non-PFU-LOGIC instructions, and no further attempt is made to translate these instructions into hardware. If such a determination is made at step 110, the process returns to step 100, and parsing of the instruction sequence continues.

If, however, at step 110 it is determined that a performance gain would still be realized, the process returns to step 102 to determine the characteristics of the reduced instruction sequence, and again proceeds to steps 104a, 104b or 104c depending upon the determination to provide the appropriate width analysis. The described process continues until each instruction sequence of the application has been analyzed.

After the width analysis, every operation which can be easily placed in a PFU has been marked as a PFU-LOGIC instruction. As illustrated in the flow diagram of FIG. 7, the determination of which instructions can be easily placed in the PFU relies largely on the bit width of the instruction. The key attribute offered by a PFU is the ability to evaluate relatively sparse Boolean functions. Dense Boolean functions cannot be programmed into a PFU due to resource constraints, and the density of a Boolean function is highly dependent upon the bit width of the component instructions.

The result of the bit-width analysis is a new, intermediate representation which includes PFU-LOGIC instructions in place of previous identified instructions or instruction sequences. In most cases, only Load/Store, Wide Add, Variable Length Shifts, Multiply, and Divide instructions remain non-PFU-Logic instructions in the integer portion of a typical RISC instruction set. The selected PFU-LOGIC instructions, following bit width analysis, are transformed to hardware using three techniques including basic block optimizations, control flow graph optimizations, and loop optimizations. Each transformation technique is described in further detail below.

Basic Block Optimizations

Once all of the instructions have been marked as PFU-LOGIC or non-PFU-LOGIC, two hardware transformation techniques can be employed within the scope of the basic block. These two transformation techniques are hereinafter referred to as BB-Expression and BB-Table-Lookup.

Referring now to FIG. 8, one example of a BB-Expression evaluation illustrates a sequence of instructions that may be combined to form one EXPFU instruction. In the instruction sequence of FIG. 8, a set of 32 bit Boolean expressions manipulate a bit vector representation of Boolean product terms to reach a given result. During the width analysis of the sequence instructions, a sequence of bit vector data structures is maintained for each instruction. Using BB-Expression evaluation, the existence of a Boolean expression is readily identified through examination of the bit-vector data structure associated with the block of instructions. The bit-vector data structure is compared against known data structures to identify the operation of the basic block. The ability of a logic analyzer to identify basic Boolean expressions is well known to those of ordinary skill in the art, and need not be described in further detail herein. Suffice it to say that the Boolean expressions are recognized and translated into one finite operation capable of being loaded into the PFU.

Once the Boolean expression has been identified, the logic synthesis tool provides a bit stream to the hardware synthesizer 80 (FIG. 1) to program the PFU. The selected block of instructions implemented by the logic synthesis tool is provided a unique LPNUM. The bit stream that is used to program the PFU is stored in LPNUM memory 30 at an address associated with the corresponding LPNUM.

Figure 9:
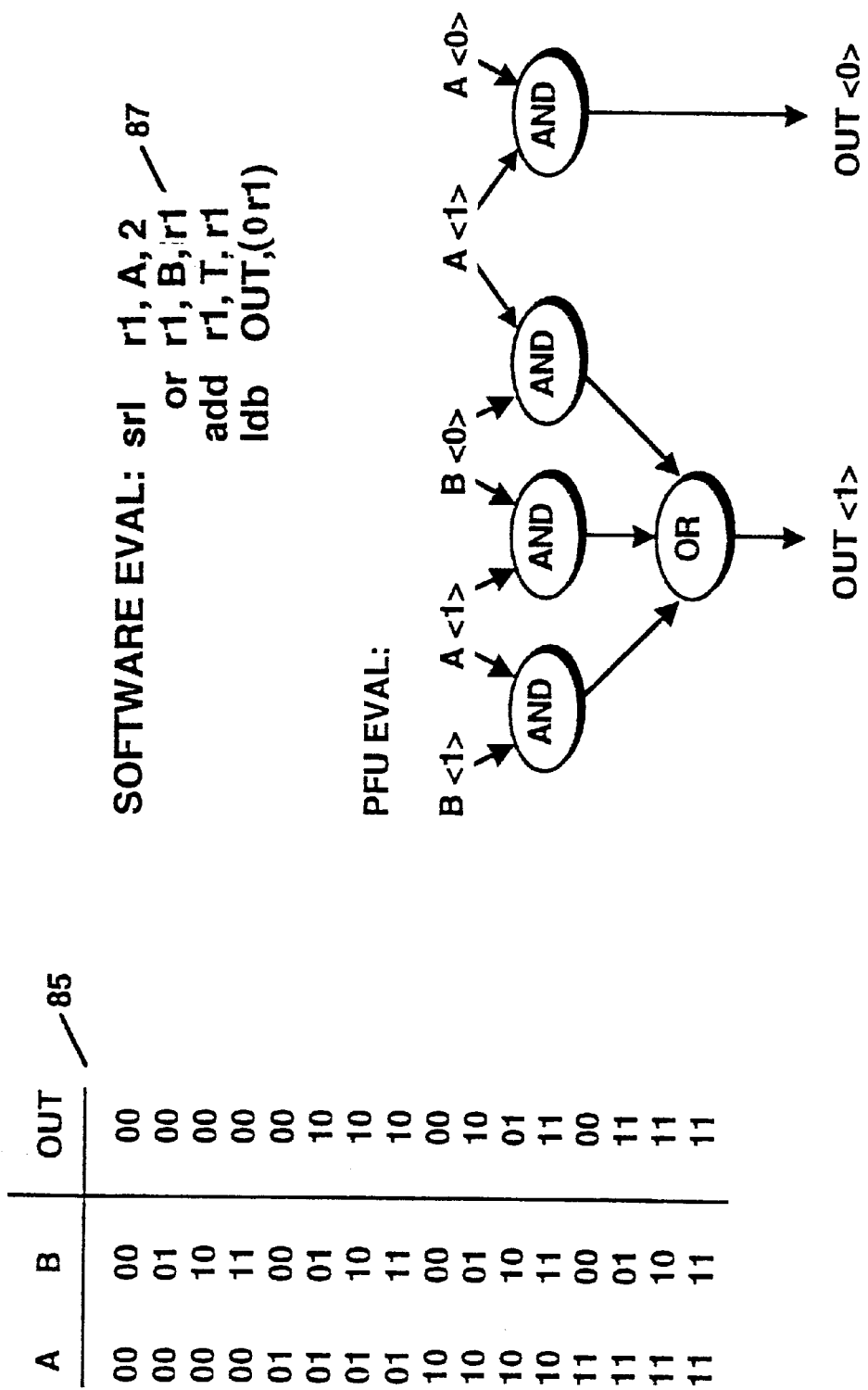
FIG. 9 includes a flow diagram and a look up table for use in illustrating the method of performing basic block look up table optimization by the hardware extraction unit of FIG. 4A.

Although Boolean expression recognition is useful when bit vector data structures are used in an application, when logic expressions become very complex, truth tables are often required to perform logic evaluations. In such instances, a different block optimization technique, known hereinafter as Basic Block Table Lookup is used. Referring now to FIG. 9, an example truth table 85 defines the functionality of a ternary NAND gate where 00 is an illegal state, 01 is a logic zero, 10 is a logic one, and 11 is a logic X. In MIPS, at least four instructions are required to evaluate this or any other two-input ternary gate through table lookup techniques. The four instruction sequence is shown as sequence 87. The number of cycles is slightly worst in the case of a cache hit, and considerably worst in the case of a cache miss for the load byte (ldb) instruction. However, as seen in FIG. 9, a single cycle PFU can easily evaluate this ternary gate. In fact, with 4-input LUTs, any ternary 2-input gate can be evaluated with just one LUT per bit. The <n> notation in the figure is used to refer to the nth bit of a word.

The truth tables defining functions are presented in the form of constant arrays in the general-purpose programming language, and are minimized and represented in a functional form using standard logic synthesis techniques. This functional form can be evaluated by a PFU using the LUTs and programmable interconnections as described above. For example, as shown in FIG. 9, the truth table 85 may be broken down into one, two level PFU evaluation 89, which is capable of being executed in one instruction cycle. The functional form, defining the LUT contents and the PFU interconnections, is assigned a unique LPNUM and stored in LPNUM memory.

Although the above description for BB-Table-Lookup has described the use of functional truth tables, it should be noted that this table lookup replacement technique can also be used to replace jump-tables for switch statements. In most cases, the hardware complexity of jump-tables is very small, concentrating on the lowest 8 bits because the virtual addresses for the highest bits are generally the same value. The jump-table offsets are minimized by the logic synthesis package, and the generated function can be placed inside a PFU. A final addition is still needed to combine the offsets produced by the PFU with a base address to produce the final jump address. However, even this addition operation can be removed, if the PFU synthesis is performed at link time when the final addresses for the switch code segments has been resolved.

Control Flow Graph (CFG) Optimizations

In their purest form, conditional branch instructions can be viewed as performing a simple Boolean operation—whether or not to take the branch. As such, conditional branch instructions are performing a sparse Boolean function. Using PFUs, two techniques, Boolean-CFG and jump-CFG optimization, can be used to eliminate branch instructions and accelerate application performance.

The Boolean-CFG optimization transforms a portion of a control flow graph into a set of Boolean equations which can be minimized and programmed into one or more PFUs. In the present invention, in order to use the Boolean-CFG optimization, the portion of a CFG must: 1) have one and only one start basic block; 2). have one and only one exit basic block; 3) contain only PFU-LOGIC instructions in all blocks except the start and exit basic block ; 4) not contain any backedges (loops).

Figures 10A, 10B:
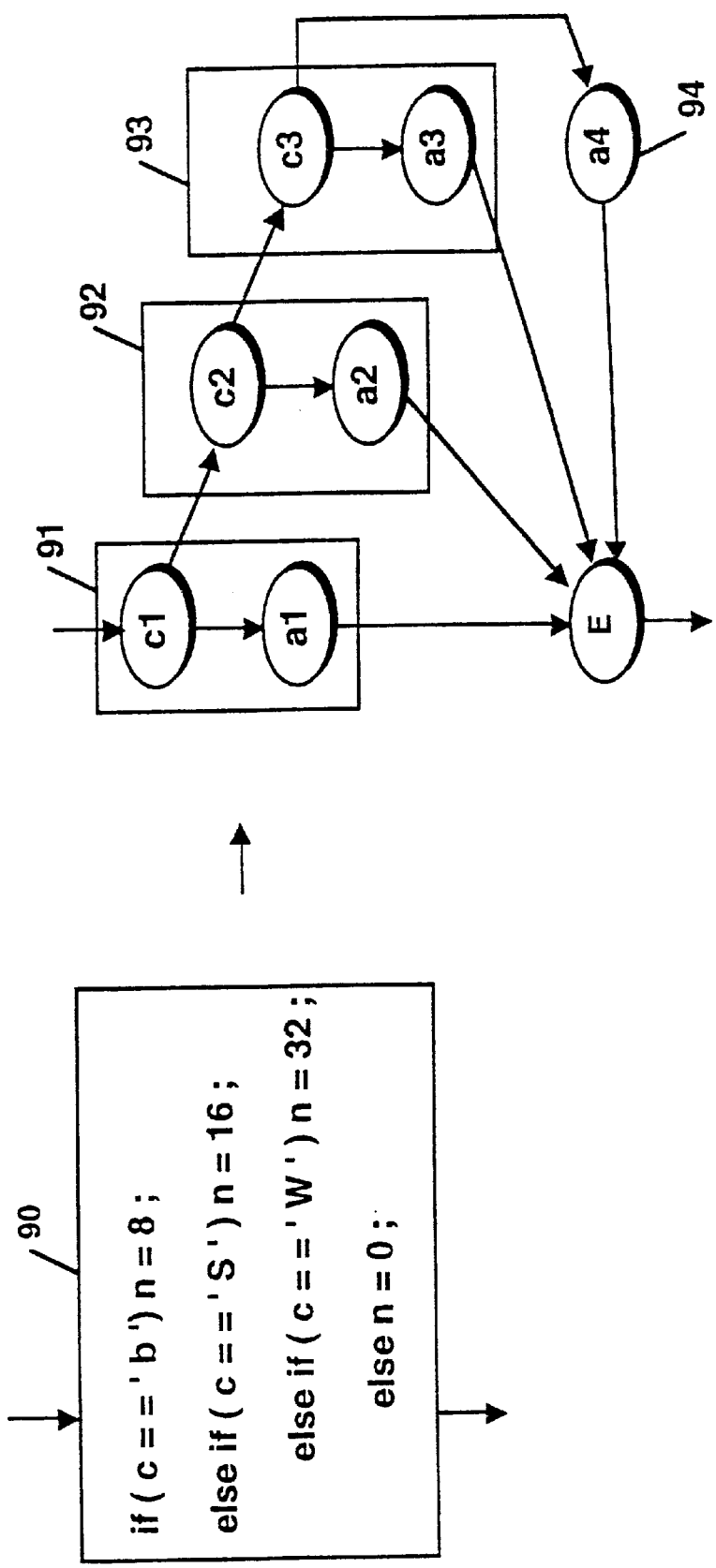
FIGS. 10A–10C comprise an instruction sequence, a flow diagram, and a logic implementation for use in illustrating the control flow graph optimization technique used by the hardware extraction unit of FIG. 4A.
Figure 10C:
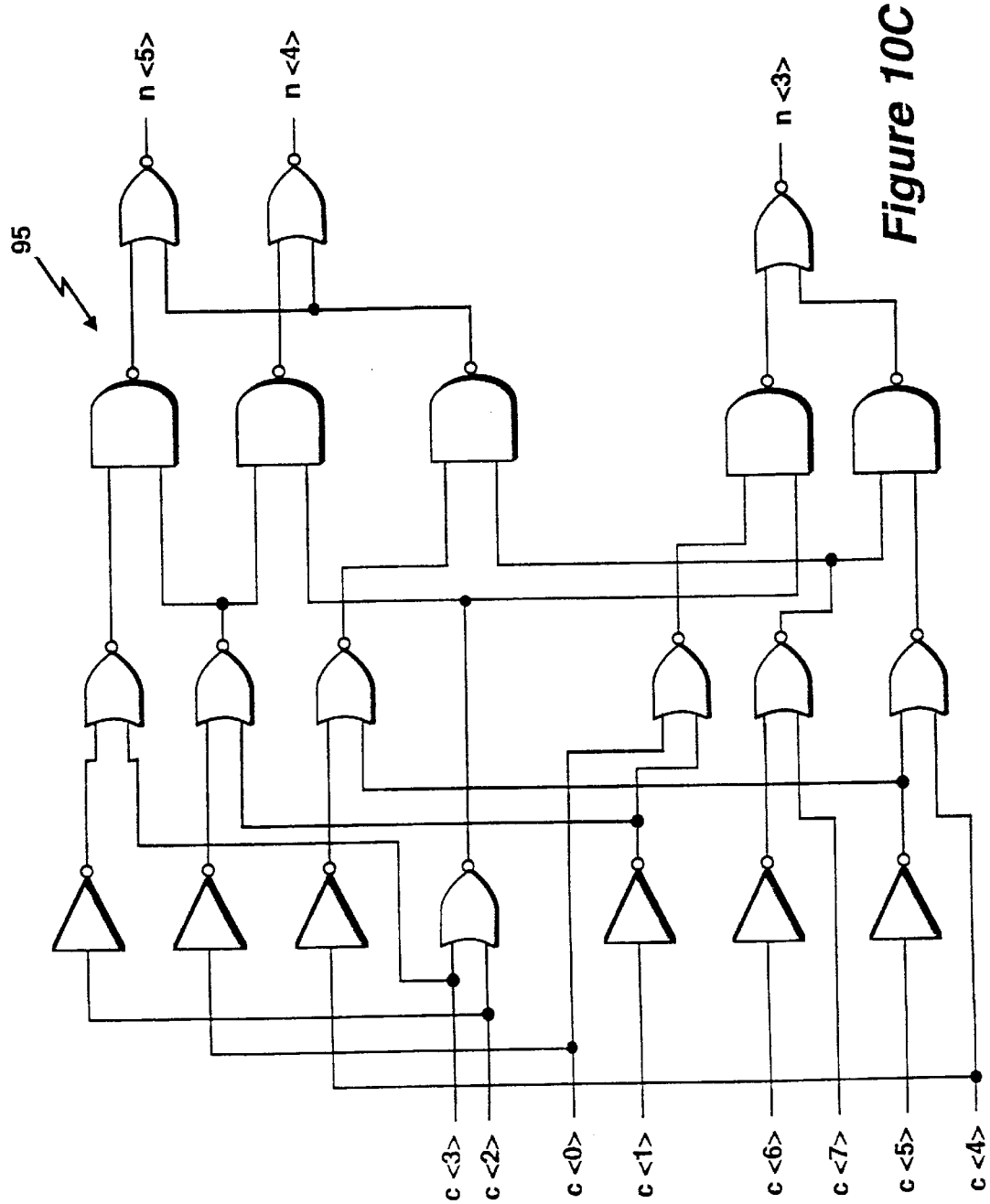

Referring now to FIGS. 10A–10C, an example is shown that serves to illustrate the Boolean-CFG optimization. The example contains an instruction sequence 90 which forms a mapping between a sparse range of characters and integers. The CFG for the code is shown in FIG. 10A. The CFG includes 4 alternative basic blocks 91, 92, 93, and 94, each of which will be executed depending upon the value of 'c'. Basic blocks 91–93 include the instructions which perform the compare and branch, (c1, c2, c3) and an assignment instructions (a1–a3, respectively). Basic block 94 includes only an assignment block, and thus provides the fall-through path for the final assignment and exit jump.

The process for the conversion of a CFG to a set of Boolean equations proceeds in three basic steps: assignment of predicates, basic block state transformation, and Boolean minimization. Predicates are calculated for each basic block by enumerating all the paths to the instructions. This enumeration creates a sum-of-products representation where each product is the set of conditions needed to build a single path. The block predicates are indicated below in Equation I as $BP_n$ where 'n' the instruction in the basic block.

$$BP_{c1}=1; BP\ a1=\overline{p1};$$

$$BP_{c2}=p1; Bpa2=p1\overline{p2};$$

$$BP_{c3}=p1,p2; Bpa3=p1p2\overline{p3};$$

$$BP\ a4=p1p2p3; \qquad \text{EQUATION I}$$

The variables 'p1', 'p2', and 'p3' indicate the values required for the instruction to be reached in the sequence of instructions. For example, in this equation, p1='b', and thus instruction a1 will be reached each time the value of the variable 'c' is equal to 'b'. Similarly, p2='s' and p3='w'.

Once the basic block predicates have been calculated, the individual basic blocks can be transformed to include the effects of the predicate. Given a basic block predicate BP and an assignment of the form OUT=A op B where op is any of the PFU-LOGIC operations, the Boolean transformational rule is shown below in Equation II:

$$OUT_{new}=(A\ op\ B)(BP)^n+OUT_{old}(BP)^n \qquad \text{EQUATION II}$$

In Equation II, $OUT_{old}$ is the value of the output variable before assignment, $OUT_{new}$ is the value of the output variable immediately after the assignment, and the $(\ )^n$ indicates a function that takes a Boolean bit and generates a 'n' bit vector by replicating the Boolean bit. All the operations in the expression are Boolean; the + operation indicates a Boolean OR not an integer addition. This transformation rule is allows the basic block to be evaluated even when the predicate is false. Thus, the evaluation of all the basic blocks in the CFG will produce exactly the same results as the conditional evaluation indicated in the control flow. Because the transformation allows the basic block to be evaluated in all instances, the CFG graph can be converted into a hardware netlist which can be evaluated by a PFU.

For example, applying the transformational technique of Equation II to the instruction a2 results in the output shown below in Equation III:

$$n_{new}=(00010000)(p_1p_2)^n+n_{old}(p_1P_2)^n \qquad \text{EQUATION III}$$

The connection between the old and new variables between basic blocks is contained in the CFG graph shown in FIG. 10B. Finally, the CFG netlist with the transformed equations for the PFU-LOGIC instructions is minimized by a Boolean logic minimizer. For the example the result of the minimization of the CFG graph is shown in FIG. 10C. The output bits which are not shown are tied to a logic zero.

The performance enhancements available using CFG optimization may be easily seen by comparing the instruction sequence of FIG. 10A with the Boolean logic of FIG. 10C. The instruction sequence of 10A, ignoring any pipeline branch delays, requires 4–8 cycles for operation. In contrast, the Boolean logic of FIG. 10C may be executed in one computer cycle.

In general, the performance gain or loss offered by a Boolean-CFG is determined by the probability of branching at each conditional branch and the actual hardware complexity of the operations. If the software has a very high probability of taking the shortest path, and the off path costs are high, the Boolean-CFG optimization will yield poor results. In practice, the profiling information from a performance analysis program such as Pixie™ is used to compare the equivalent software cost with the PFU hardware cost to determine the applicability of this optimization for a particular CFG graph. Control flow graphs which move information or use only low complexity hardware instructions such as move, constant shift, and logic operations generally benefit from this optimization.

Unfortunately, control flow graphs that use non-PFU-LOGIC instructions such as loads/stores and which do not have a single exit point do not benefit from the Boolean-CFG optimization. However, in many cases, PFUs can still be used to accelerate performance using a technique called jump-CFG optimization. The jump-CFG optimization attempts to convert a control flow graph into a table lookup by converting a set of if/else statements into a 'switch' statement in C terminology. PFU resources are used for the complex conditional evaluation combined with the final table lookup. In order to use the Jump-CFG optimization, the selected portion of the CFG should have one and only one start basic block, contain only PFU-LOGIC instructions for the conditional expressions and not contain backedges (loops).

An example of the transformation for a jump-CFG optimization is shown in conjunction with FIG. 11A and FIG. 11B. FIG. 11A illustrates a control flow graph of a sequence of instructions having conditional branches. In FIG. 11A and 11B, the $c_n$ instructions represent conditional branch instructions, and $b_n$ represent the remaining instructions. The intent of jump-CFG optimization is to accelerate performance by centralizing all branching to a single dynamic branch. This is accomplished as seen in FIG. 11B, where the evaluation of the conditions instructions is moved up to the start basic block 120, and all possible paths from the start basic block are fed information from the start basic block.

As shown in FIG. 11B, although there are 8 unique combinations of values for the three conditions of the branching instructions in the start block 120, there are four unique paths which may be taken from the control flow graph of FIG. 11A. Referring now to Table II below, the 8 possible combinations of values for the conditions, c1, c2 and c3 are shown. For each possible value of the conditions, the resulting code sequences are shown in the second column.

TABLE III

| C1 | C2 | C3 | Code Sequence | Unique Sequence |
|----|----|----|----|----|
| 0 | 0 | 0 | B1, B2, B4 | A1 |
| 0 | 0 | 1 | B1, B2, B4 | A1 |
| 0 | 1 | 0 | B1, B2, B5 | A2 |
| 0 | 1 | 1 | B1, B2, B5 | A2 |
| 1 | 0 | 0 | B1, B3, B6 | A3 |
| 1 | 0 | 1 | B1, B3, B7 | A4 |
| 1 | 1 | 0 | B1, B3, B6 | A3 |
| 1 | 1 | 1 | B1, B3, B7 | A4 |

As Table III and FIG. 11B show, only 4 of the 8 combinations, A1, A2, A3, and A4 produce unique code streams. PFUs are used to reduce the three condition evaluations to a single evaluation via a method similar to the table-lookup method described above, where the output comprises pointers to the four offset unique code streams. Notice, that upon determination of the conditions and the execution of one of the four code sequences 122, 124, 126 or 128, the instruction sequence can jump to any location, and are not required to reconverge like the Boolean-CFG optimization. Thus, the Jump-CFG optimization can be applied to a wider class of control flow graphs.

FIGS. 11A and 11B also illustrate the possible negative ramifications of a jump-CFG optimization. First, there is a significant increase in the code size which can degrade instruction cache performance. Second, this technique forces a premature evaluation of all conditional expressions in the CFG graph. This premature evaluation can degrade performance in CFGs where the shortest path is executed with the highest probability. However, it should be noted that because the operations are PFU-LOGIC operations, the premature evaluation of the conditional expressions will not cause exceptions, and will be evaluated more quickly because it is a PFU-LOGIC operation. Just as in the Boolean-CFG optimization, branch probability data from a performance analysis tool is used to determine the conditions under which the jump-CFG optimization should be employed.

Loop Optimizations

For any software application, a significant proportion of the overall CPU time is spent in loops. Loop unrolling is a powerful technique used by most modern compilers to accelerate performance by removing loops. By loop unrolling it is meant that the basic blocks in the loops are set out as a repetitive series of instructions to reduce the number of branches executed by the loop instruction. For example, referring now to Equation IV below, an example of a loop instruction sequence is shown. In Equation V below, the effect of unrolling the instruction sequence is provided:

$$w = 0;$$
$$\text{while } (i\&0x1 == 0)$$
$$\{ w\text{++};$$
$$i=i>>1;\}$$

EQUATION IV $$w=0;$$
$$L: \quad \text{if } ((i\&0x1) !=0) \text{ exit}$$
$$w\text{++};$$
$$i=i>>1;$$
$$\text{if}((i\&0x1 !=0) \text{ exit}$$
$$i=i>>1;$$
$$\text{go to } L;$$

EQUATION V

Loop unrolling also offers a greater opportunity for the invocation of the basic block and CFG graph optimizations described previously with reference to FIGS. 8–11. For example, consider the equations provided in Equation IV and V above, which provides the functionality of find-first-bit. Equation IV illustrates a "while" loop that counts the number of zeros before a one-bit is reached. Equation V illustrates the pseudo code with the loop unrolled by one iteration.

The width analysis algorithm for loops, described above, would declare the loop in the figure as a fixed length loop having a maximum of 32 iterations for a 32-bit machine (i.e. the maximum shift amount). In the example shown in Equations IV and V, all the variables in the loop can be converted to PFU-LOGIC instructions, i.e., the variable w can be limited to 5 bits. If the loop unrolling algorithm fully unrolled this "while" loop, the Boolean-CFG optimization can be used to transform this loop into one combinational PFU evaluation.

Given the unrolling shown in Equation V, because there are multiple exit points from the instruction stream, the use of the Boolean-CFG optimization is unavailable. However, jump-CFG optimization can be effectively used to accelerate performance. Since this is a loop, only one path through the code is heavily exercised, and the code duplicated for the infrequently exercised paths is not very efficiently utilized.

Referring now to Equation VI below, a second transformation for unrolling the loop is shown. This transformation is hereinafter referred to as PFU-LOOP optimization.

EQUATION VI $$w=0;$$
$$L: \quad \text{if}(((i\&0x1)!=0)||(((i>>1)\&0x1!=0))L\_exit;$$
$$i=i<<2;$$
$$w=w+2;$$
$$\text{go to } L;$$
$$L\_exit:$$
$$\quad \text{if } ((i\&0x1)==0) \text{ exit};$$
$$\quad i=i<<1;$$
$$\quad w\text{++};$$
$$\text{exit:}$$

As seen above, like the jump-CFG optimization, the condition expressions are moved to the top of the CFG and evaluated by a PFU. However, unlike the jump-CFG optimization, a jump table is not generated. Instead, a determination is made whether the exit condition is satisfied. If the exit condition is not satisfied, the code through the body of the loop is executed. If the conditions for exit exist, a local exit point is created, and one final iteration through the original code is performed. With the PFU-loop optimization, only one level of code duplication is needed, and the most frequently taken path can still be optimized free of exit conditionals. In addition, the conditional expression evaluation performed by a PFU is slightly less complex because jump table offsets are no longer needed.

When loops walk over a bit field, the PFU-LOOP optimization is very successful at providing enhanced performance for loop operations. However, in most cases loops walk over memory—i.e. load/store instructions are part of the conditional expression. The PFU-LOOP optimization can be extended to include load instructions in the conditional expressions, but including these instructions introduces a number of important issues. First, premature (speculative) execution of load/store instructions may introduce memory management exceptions. These exceptions may interfere with the execution of the PFU operation, and cause problems is a PFU function is switched out of LPNUM memory. Second, the movement of loads past stores may violate program semantics unless memory is disambiguated. Such an occurrence would result in the corruption of data and incoherent operation of the application. Third, merged short loads/stores may introduce memory alignment exceptions, again resulting in data coherency problems.

However, although such problems exist, PFU-LOOP optimization of loops having memory references may be used to increase the loop performance. Provided there is some knowledge of the initial alignment of array variables and using conventional exception handling schemes, PFUs can provide considerable performance gain for applications which walk over short memory arrays.

For example, a code sequence wherein loop optimization provides particularly increased performance is in the 'strien' function, used to determine the length of a string. If the initial address of the string is guaranteed to be longword aligned, 4 bytes may be merged into one longword, and 4 byte increments can be merged into one long addition. Because the longword is aligned, memory exceptions are precluded and it is ensured that the word will not cross a page boundary.

Finally, the key feature of this optimization is the ability of the PFU to perform parallel byte compares to zero. For long strings, the new loop can perform a string compare over 2.5-times faster than the old code for a 32 bit machine and over 5-times faster for a 64 bit machine.

In general, the alignment characteristics of the start of a software array can be determined at compiler time. All allocated memory can be forced to be aligned, so that only calculated addresses are potentially unaligned. If a loop makes multiple array references and the references cannot be determined to be aligned at compile time, the PFU-loop optimization cannot be employed, and the old byte-oriented loop must be used. However, if only one array reference is made in a potentially unaligned loop, an additional initial byte loop can be used to align references for the main loop.

Thus it has been described how the compiler operates to select instruction sequences for PFU implementation by first performing a width analysis and then transforming the instruction sequence into a Boolean expression which can be synthesized via standard logic synthesis tools and stored in LPNUM memory.

Each time an application is compiled, the above steps are executed to provide the appropriate LPNUM memory contents corresponding to the application. Of course, a computer system executes many applications during operation. As each application is switched out, the LPNUM memory is updated as described below.

Context Switching and Binary Compatibility

The PRISC computer described above accelerates performance by optimizing across the hardware/software interface. Any such technique must address issues of exception handling, context switching, and binary compatibility. There are many approaches to address these three issues.

As with conventional computers, exceptions occur when something out of the ordinary instruction execution process is encountered. When an exception occurs, and exception handler (typically part of the computer operating system) deals with the anomaly and attempts to restore the system to normal operating conditions. Some examples of typical exceptions are machine checks and hardware interrupts. In the preferred embodiment, exceptions are handled by a usage policy where exception handlers should not use PFU resources to accelerate exception processing. If an exception handler does use PFU resources, it is the responsibility of the exception handler to restore the PFU programming memory.

Context switches, however, must be handled by the underlying hardware. According to the preferred embodiment of the present invention, the logic-PFU number zero represents the state for an unprogrammed PFU. During system initialization and during context switching, the Pnum register 25 (FIG. 1) for every PFU is cleared. The next EXPFU instruction may trigger an exception which will invoke the PFU programming handler for the PFU. In this manner, when one process needs to be switched out for the operation of another (i.e. context switch) the entire PFU need not be erased, only invalidated. As such the time required for a context switch is drastically reduced.

The mapping between PFU and PFU programming memory is exact, and the PFU programming information cannot be easily modified to fit into another PFU microarchitecture. This means that recompilation is the best method to achieve superior performance for PRISC computers. However, binary compatibility is a desirable feature for all computers, and can be achieved on PRISC computers with some loss in performance.

According to a preferred embodiment of the present invention, the PRISC software compiler retains the original base RISC instructions which were transformed to PFU hardware instructions by the hardware synthesis tools. The original base RISC code is maintained with the compiled application so that in the event of binary incompatibility, the PFU programming exception handler executes the base RISC code instead of programming the PFU. This scheme has two places for performance degradation. First, an exception penalty is introduced for every EXPFU instruction. Second, the base RISC instructions evaluation of the Boolean expression is much worst than the PFU evaluation. Further, the two forms of performance degradation are introduced at the most critical portions of the application code. However, binary compatibility is maintained across different PRISC generations, and a recompilation will again lead to maximal performance.

Having described a preferred embodiment of the invention, it will be apparent to one of skill in the art that changes to this embodiment and other embodiments may be used without departing from the principles and spirit of the invention, the scope of which is defined by the appended claims.

What is claimed is:

1. A method for optimizing the performance of a software application executing on a computer system, said method comprising the steps of:

parsing said application including identifying a plurality of sequences of instructions of said application having a desired bit width of an instruction sequence, the step of identifying including the steps of determining a type of each sequence of instructions, determining a bit width of said sequence of instructions, removing an instruction from said instruction sequence upon determining the bit width of said instruction sequence exceeds said desired bit width, removing an instruction from said instruction sequence when said bit width of said instruction sequence exceeds said desired bit width of said instruction sequence, and repeating said steps of determining said bit width and removing an instruction until said sequence has a bit width less than or equal to said desired bit width;

translating each sequence of instructions into one operable function; and assigning an identifier to each one of said operable functions.

2. The method according to claim 1 wherein each of said instructions in said sequence have a Boolean characteristic, wherein said step of determining said bit width of said instruction sequence further comprises the step of mapping said Boolean characteristic into a monotomic ternary characteristic.

3. The method according to claim 2, wherein said step of mapping further includes the steps of:

providing a ternary equivalent for a function of each instruction, said ternary equivalent having a plurality of inputs and a plurality of outputs; and coupling said ternary equivalents in a series corresponding to said series of instructions.

4. The method according to claim 3, further comprising the step of traversing forward through said coupled ternary equivalents using a plurality of inputs to identify dynamic outputs of said equivalents.

5. The method according to claim 4, wherein said step of traversing further comprises a backward traversal of said coupled ternary equivalent for determining of said outputs are coupled to other instruction sequences.

6. The method according to claim 5, said determined bit width corresponding to said number of outputs of said coupled ternary equivalents identified as dynamic outputs that are coupled to other instruction sequences.

7. The method according to claim 3, wherein said type of sequence of instructions is a join type instruction sequence receiving input from a group of said plurality of sequences of instructions.

8. The method according to claim 7, further comprising the steps of:

providing a control flow graph representing a merge point of said group of sequences of instructions of said join type instruction sequence; and traversing forward through said coupled ternary equivalents preceding said merge point of said join type using a plurality of inputs to resolve inputs from said plurality of instructions to one output having a number of dynamic bits.

9. The method according to claim 8, further comprising the step of traversing backward through said instructions succeeding said merge point of said instruction sequence including the step of propagating output values at said merge point back into each of said plurality of sequences of instructions.

10. The method according to claim 9 wherein said step of traversing backward further comprises the step of determining the number of said dynamic outputs which are required by instruction sequences succeeding said merge point.

11. The method according to claim 10, wherein said determined bit width corresponds to said number of dynamic bits of said output which are required by instruction sequences succeeding said merge point.

12. The method according to claim 3 wherein said type of sequence of instructions is a split type instruction sequence providing output to a group of succeeding sequences of instructions.

13. The method according to claim 12, further comprising the steps of:

providing a control flow graph representing a divergence point of split type instruction to said group of sequences of instructions; and traversing backward through said coupled ternary equivalents succeeding said divergence point of said split type instruction using a plurality of outputs to resolve outputs from said plurality of instruction sequences to one input having a number of dynamic bits.

14. The method according to claim 13, further comprising the step of traversing forward through said instructions preceding said diverge point of said instruction sequence including the step of propagating output values at said divergence point to the inputs of the ternary equivalents of each of said plurality of sequences of instructions.

15. The method according to claim 14 wherein said step of traversing backward further comprises the step of determining the number of said dynamic inputs which are required by instruction sequences succeeding said divergence point.

16. The method according to claim 15, wherein said determined bit width corresponds to said number of dynamic bits of said inputs which are required by instruction sequences succeeding said divergence point.

17. The method according to claim 3, wherein said type instructions is a loop type instruction sequence comprising an iterator and a group of instructions which are executed repeatedly responsive to the value of said iterator.

18. The method according to claim 17, wherein said step of determining said width of said loop type instruction sequence comprises the steps of:

determining a width of said plurality of instructions which are executed repeatedly by:

traversing forward through said coupled ternary equivalent of said group using a plurality of inputs to identify a number of dynamic outputs of said equivalents, said number representing said width of said group; and increasing said width of said group according to said iterator.

* * * * *

UNITED STATES PATENT AND TRADEMARK OFFICE
CERTIFICATE OF CORRECTION

PATENT NO. : 6,035,123
DATED : March 7, 2000
INVENTOR(S) : Rahul Razdan and Michael D. Smith It is certified that error appears in the above-identified patent and that said Letters Patent is hereby corrected as shown below:

In Claim 17, column 22, line 44, after "type" insert --of sequence of--.

Signed and Sealed this

First Day of May, 2001

Attest:

NICHOLAS P. GODICI

*Attesting Officer*   *Acting Director of the United States Patent and Trademark Office*

UNITED STATES PATENT AND TRADEMARK OFFICE
CERTIFICATE OF CORRECTION

PATENT NO. : 6,035,123 Page 1 of 1
DATED : March, 7, 2000
INVENTOR(S) : Rahul Razdan and Michael D. Smith It is certified that error appears in the above-identified patent and that said Letters Patent is hereby corrected as shown below:

<u>Title page,</u>
Item [73] Assignee, add "President and Fellows of Harvard College, Cambridge, Massachusetts"

Signed and Sealed this

Eleventh Day of September, 2001

Attest:

NICHOLAS P. GODICI
Attesting Officer     *Acting Director of the United States Patent and Trademark Office*